(12) United States Patent
Gutierrez et al.

(10) Patent No.: US 9,386,562 B2
(45) Date of Patent: *Jul. 5, 2016

(54) METHOD AND APPARATUS FOR SIGNALING IN DIGITAL RADIO SYSTEMS

(71) Applicant: Samsung Electronics Co., Ltd., Gyeonggi-do (KR)

(72) Inventors: Ismael Gutierrez, Middlesex (GB); Alain Mourad, Middlesex (GB)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,905

(22) Filed: Nov. 2, 2015

(65) Prior Publication Data

US 2016/0073380 A1 Mar. 10, 2016

Related U.S. Application Data

(63) Continuation of application No. 14/276,625, filed on May 13, 2014, now Pat. No. 9,179,440, which is a continuation of application No. 13/222,624, filed on Aug. 31, 2011, now Pat. No. 8,804,675.

(30) Foreign Application Priority Data

Aug. 31, 2010 (GB) .................................. 1014432.7

(51) Int. Cl.
| | |
|---|---|
| *H04J 3/00* | (2006.01) |
| *H04W 72/04* | (2009.01) |
| *H04L 1/00* | (2006.01) |
| *H04L 27/26* | (2006.01) |

(Continued)

(52) U.S. Cl.
CPC ............... *H04W 72/04* (2013.01); *H04L 1/008* (2013.01); *H04L 1/0084* (2013.01); *H04L 1/0086* (2013.01); *H04L 27/2602* (2013.01); *H04L 65/607* (2013.01); *H04W 72/005* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 6,445,717 B1 | 9/2002 | Gibson et al. | |
| 8,503,550 B2 * | 8/2013 | Ko | H04L 5/0007 341/173 |
| 8,804,675 B2 | 8/2014 | Gutierrez et al. | |

(Continued)

FOREIGN PATENT DOCUMENTS

| | | |
|---|---|---|
| EP | 1 624 605 | 2/2006 |
| EP | 2 101 431 | 9/2009 |

(Continued)

OTHER PUBLICATIONS

UK Search Report dated Dec. 14, 2010 issued in counterpart application No. 1014432.7.

*Primary Examiner* — Afshawn Towfighi
(74) *Attorney, Agent, or Firm* — The Farrell Law Firm, P.C.

(57) ABSTRACT

A method of transmitting at least one data stream by a transmitter in a wireless communication system is provided. The method includes generating a preamble section including signaling information and a data section including at least one data stream; generating a frame including the preamble section and the data section; and transmitting the generated frame, wherein the signaling information includes first information including information related to the at least one data stream.

16 Claims, 13 Drawing Sheets

(51) Int. Cl.
*H04L 29/06* (2006.01)
*H04W 72/00* (2009.01)

(56) References Cited

U.S. PATENT DOCUMENTS

2009/0213853 A1 8/2009 Kwon et al.
2010/0085985 A1 4/2010 Pekonen et al.
2011/0200128 A1 8/2011 Ko et al.

FOREIGN PATENT DOCUMENTS

| EP | 2 219 336 | 8/2010 |
| EP | 2 255 529 | 12/2010 |
| WO | WO 02/080528 | 10/2002 |
| WO | WO 2007/004030 | 1/2007 |
| WO | WO 2007/072138 | 6/2007 |
| WO | WO 2009/093809 | 7/2009 |
| WO | WO 2009/115481 | 9/2009 |

* cited by examiner

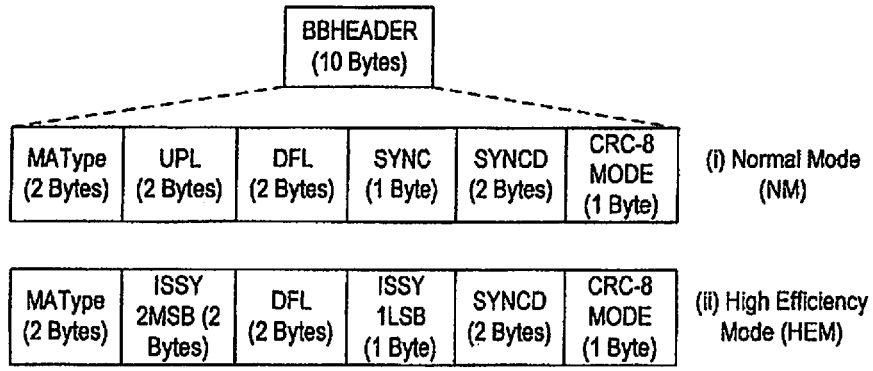

Option 1):
In DVB-T2 the second byte of MATYPE contains the Input Stream Identifier.
This information can be obtained directly from L1 tables and therefore is redundant.

| MATYPE (2 Bytes) ||  |
|---|---|---|
| MATYPE 1st Byte | Same contents as in DVB-T2 ||
| MATYPE 2nd Byte | IS_Length (6bits): | Contains the length of the Inband Signalling field measured in bytes. |
|  | Rsv (2bits): | Reserved for future use. |

Option 2):
1 byte is added to the BB Header

| MAType (2 Bytes) | IS_length (6 bits) | Rsv. (2 bits) | UPL (2 Bytes) | DFL (2 Bytes) | SYNC (1 Byte) | SYNCD (2 Bytes) | CRC-8 MODE (1 Byte) |
|---|---|---|---|---|---|---|---|

(i) Normal Mode (NM)

| MAType (2 Bytes) | IS_length (6 bits) | Rsv. (2 bits) | ISSY 2MSB (2 Bytes) | DFL (2 Bytes) | ISSY 1LSB (1 Byte) | SYNCD (2 Bytes) | CRC-8 MODE (1 Byte) |
|---|---|---|---|---|---|---|---|

(ii) High Efficiency Mode (HEM)

*FIG. 5*

| Field | Size (bits) | |
|---|---|---|
| PLP_L1_Change_FLAG | 1 | ⎫ 18 |
| For j=0.. P$_I$-1 { | | ⎬ |
|     SUB_SLICE_INTERVAL | 22 | ⎬ |
|     START_RF_IDX | 3 | ⎬ P$_I$ x 56 +11 bits |
|     CURRENT_PLP_START | 22 | ⎬ |
|     Rsv_2 | 9 | ⎬ |
| } | | |
| CURRENT_PLP_NUM_BLOCKS | 10 | ⎭ |
| OTHER_ADD_PARITY_BLOCKS | 4 | ⎫ |
| For i=0..OTHER_ADD_PARITY_BLOCKS{ | | |
|     AP_Type | 2 | 20 |
|     AP_Start | 8 | ⎬ 5 + O$_{APB}$*24 bits |
|     AP_Length | 8 | |
|     AP_Frame_Offset | 4 | |
|     Rsv_1 | 2 | |
| } | | |
| Rsv_2 | 1 | ⎭ |
| NUM_OTHER_PLP_IN_BAND | 8 | ⎫ |
| For i=0..NUM_OTHER_PLP_IN_BAND-1{ | | |
|     PLP_ID | 8 | |
|     PLP_START | 22 | ⎬ 8 + O$_{PIB}$ x 48 bits |
|     PLP_NUM_BLOCKS | 10 | |
|     Rsv_3 | 8 | |
| } | | ⎭ |
| CRC | 16 | 22 |
| Rsv_2 | Rest of BB Frame | |

*FIG. 6*

| Field | Size (bits) |
|---|---|
| Type | 8 |
| BWT_EXT | 1 |
| S1 | 3 |
| S2 | 4 |
| L1_Repetition_Flag | 1 |
| Guard_Interval | 3 |
| PAPR | 4 |
| L1_CONFIG_MOD | 4 |
| L1_CONFIG_COD | 2 |
| L1_CONFIG_FEC_TYPE | 2 |
| L1_CONFIG_SIZE | 18 |
| L1_DYN_MOD | 4 |
| L1_DYN_COD | 2 |
| L1_DYN_FEC_TYPE | 2 |
| L1_DYN_SIZE | 18 |
| L1_DYN_INFO_SIZE | 18 |
| ADD_PARITY_BLOCKS | 4 |
| PILOT_PATTERN | 4 |
| TX_ID_AVAILABILITY | 8 |
| CELL_ID | 16 |
| NETWORK_ID | 16 |
| T2_SYSTEM_ID | 16 |
| NUM_T2_FRAMES | 8 |
| NUM_DATA_SYMBOLS | 12 |
| REGEN_FLAG | 3 |
| L1_POST_EXTENSION | 1 |
| NUM_RF | 3 |
| CURRENT_RF_IDX | 3 |
| Reserved | 10 |
| CRC_32 | 32 |

24 — Separate L1-Config and L1-Dyn requires signalling each independently.

(Total: 226 bits)

FIG. 7

| Field | Size (bits) |
|---|---|
| SUBSLICES_PER_FRAME | 15 |
| NUM_PLP | 8 |
| NUM_AUX | 4 |
| AUX_CONFIG_RFU | 8 |
| For i=0..NUM-RF-1 { | |
|     RF_IDX | 3 |
|     FREQUENCY | 32 |
| } | |
| IF S2== "xxx1" { | |
|     FEF_TYPE | 4 |
|     FEF_LENGTH | 22 |
|     FEF_INTERVAL | 8 |
| } | |
| For i=0 .. NUM_PLP – 1 { | |
|     PLP_ID | 8 |
|     PLP_TYPE | 3 |
|     PLP_PAYLOAD_TYPE | 5 |
|     FF_FLAG | 1 |
|     FIRST_RF_IDX | 3 |
|     FIRST_FRAME_IDX | 8 |
|     PLP_GROUP_ID | 8 |
|     PLP_COD | 3 |
|     PLP_MOD | 3 |
|     PLP_ROTATION | 1 |
|     PLP_FEC_TYPE | 2 |
|     PLP_NUM_BLOCKS_MAX | 10 |
|     FRAME_INTERVAL | 8 |
|     TIME_IL_LENGTH | 8 |
|     TIME_IL_TYPE | 1 |
|     IN_BAND_FLAG | 1 |
|     IN_BAND_POINTER | 3 |
|     Rsv_1 | 13 |
| } | |
| Rsv_2 | 32 |
| For i=0..NUM_AUX-1 { | |
|     AUX_RFU | 32 |
| } | |
| AP_Start | 8 |
| For i=0..ADD_PARITY_BLOCKS-1 { | |
|     AP_Length | 8 |
|     AP_Frame_Offset | 4 |
|     Rsv_1 | 2 |
| } | |
| Rsv_2 | 1 |
| CRC_32 | 16 |

FIG. 8

METHOD AND APPARATUS FOR SIGNALING IN DIGITAL RADIO SYSTEMS

PRIORITY

This patent application is a Continuation application of U.S. patent application Ser. No. 14/276,625, filed in the U.S. Patent and Trademark Office on May 13, 2014, which is a Continuation application of U.S. patent application Ser. No. 13/222,624, filed in the U.S. Patent and Trademark Office on Aug. 31, 2011, and is now U.S. Pat. No. 8,804,675 issued on Aug. 12, 2014, which claims priority under 35 U.S.C. §119(a) to Patent Application Serial No. GB 1014432.7, which was filed in the United Kingdom Intellectual Property Office on Aug. 31, 2010, the contents of each of which are incorporated herein by reference.

BACKGROUND OF THE INVENTION

1. Field of the Invention

The present invention relates generally to wireless communication systems, and more specifically, but not exclusively, to a method and apparatus for signaling physical layer information in a broadcast system.

2. Description of the Related Art

A wireless communication system, such as a Digital Video Broadcasting (DVB) system, transmits data in a sequence of frames. For example, a DVB system may operate according to a DVB-Terrestrial $2^{nd}$ Generation (T2) standard, an Advanced Televisions Systems Committee (ATSC) standard, an Integrated Services Digital Broadcasting (ISDB) standard, or a Digital multimedia Broadcasting (DMB) standard. Each frame typically includes a preamble section and a data section, which are time-multiplexed. The data section carries data arranged in a number of data streams, which are commonly referred to as Physical Layer Pipes (PLPs). For example, a PLP may carry a service, such as a video channel provided to a user.

Reception of data from the frames, and reception of the data streams, may be assisted by signaling, which is typically carried in the preamble of the frame, i.e., Out-of-Band (OB) signaling, and/or carried in the data section, typically of the preceding frame, i.e., In-Band (IB) signaling. The signaling may be referred to as physical layer signaling, or Layer 1 (L1) signaling. The signaling may indicate a modulation or coding scheme to be used for decoding data, and sections of a data field to be decoded, or the location of a data stream within the data section.

The efficiency of L1 signaling, in particular, for battery-powered digital broadcasting receivers in a mobile environment, may be measured mainly from the perspectives of Robustness, Power Consumption, delay in changing channels ("zapping" delay), and Latency. Prior art systems in the mobile broadcasting context may suffer from insufficient robustness of L1 signaling as compared to robustness of data. This is quite critical as the L1 signaling is important to access the data later in the frame. Accordingly, if the L1 signaling is lost, the data will be lost too. The lack of robustness is mainly due to the lack of time diversity as the L1 signaling, in particular, OB signaling, may be located at the beginning of a frame and typically does not apply any time interleaving across the frame.

In order to alleviate this problem, some solutions have been proposed and adopted as options in the context of the DVB-T2 standard. Specifically, a repetition solution repeats the L1 signaling corresponding to a next frame, in a current frame. Thus, the L1 signaling has two copies, one in the previous frame and another one in the current desired frame, which improves the robustness at the expense of doubling the overhead, i.e., reducing the spectral efficiency.

Additionally, IB signaling has been proposed, which involves encapsulating the L1 signaling for accessing and decoding data at a following frame into a data section of a current frame. In this proposal, the signaling is time interleaved and benefits from a higher diversity. However, the IB signaling is applicable for continuous reception only, but not for initial scanning, zapping, or updating. IB signaling may provide some improved service continuity at good robustness, but still not enough, or in low mobility scenarios.

Specifically, conventional systems do not provide an efficient L1 signaling solution that achieves robustness for initial scanning, service continuity, zapping, and updating, and is applicable in a variety of mobility scenarios.

SUMMARY OF THE INVENTION

Accordingly, the present invention has been made to solve the above-described problems occurring in the prior art, and to provide at least the advantages described below.

In accordance with an aspect of the present invention, a method of transmitting at least one data stream by a transmitter in a wireless communication system is provided. The method includes generating a preamble section including signaling information and a data section including at least one data stream; generating a frame including the preamble section and the data section; and transmitting the generated frame, wherein the signaling information includes first information including information related to the at least one data stream.

BRIEF DESCRIPTION OF THE DRAWINGS

The above and other aspects, features, and advantages of the present invention will be more apparent from the following detailed description taken in conjunction with the accompanying drawings, in which:

FIG. 5 illustrates a baseband header according to an embodiment of the invention;

FIG. 6 illustrates IB signaling content according to an embodiment of the invention;

FIG. 7 illustrates L1-Pre OB signaling content according to an embodiment of the invention;

FIG. 8 illustrates L1-Config OB signaling content according to an embodiment of the invention;

DETAILED DESCRIPTION OF EMBODIMENTS OF THE INVENTION

Various embodiments of the present invention will be described in detail below with reference to the accompanying drawings. In the following description, detailed explanations of known related functions and constitutions may be omitted to avoid unnecessarily obscuring the subject manner of the present invention.

By way of example, embodiments of the present invention will be described below with reference to a DVB Next Generation Handheld (DVB-NGH) standard, which is based on the $2^{nd}$ generation terrestrial DVB-T2 system. However, it will be understood that these embodiments are not limited to the DVB-NGH) standard, and may involve other wireless systems. Additionally, the described embodiments are not limited to transmitting digital video signals.

In accordance with an embodiment of the present invention, a robust and efficient method is provided for signaling Layer 1 information. The method is applicable to different uses, such as an initial scan, zapping (channel switching), an update, and service continuity.

Figure 1:
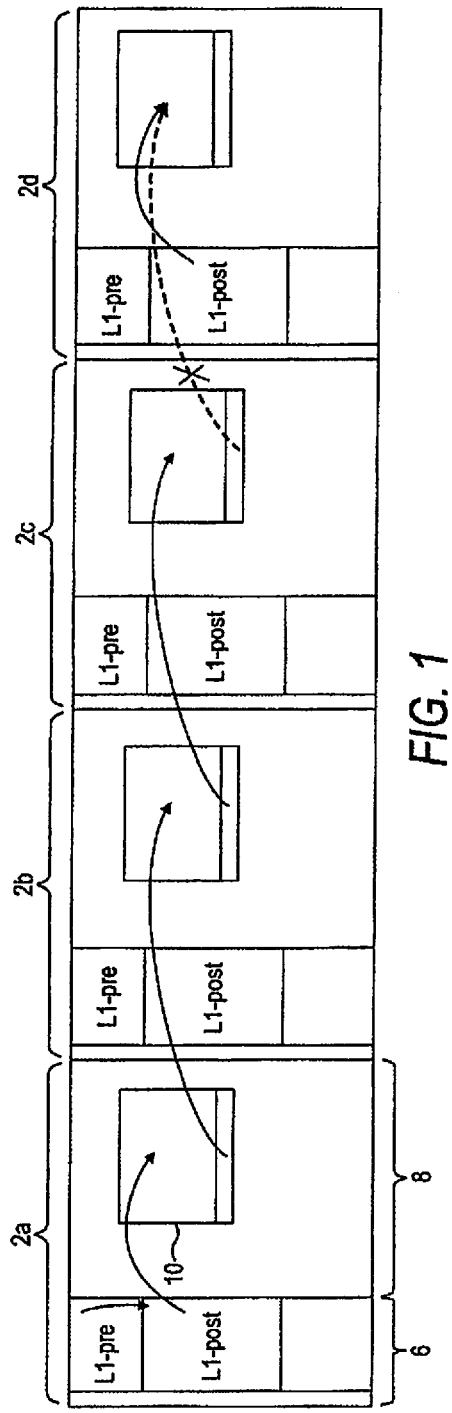
FIG. 1 illustrates conventional signaling in a sequence of data frames.

FIG. 1 illustrates conventional signaling in a sequence of data frames. Specifically, FIG. 1 illustrates conventional Layer 1 signaling.

Referring to FIG. 1, the sequence of data frames includes frames 2a, 2b, 2c, and 2d. The preamble of each frame is represented by the sections indicated as L1-Pre and L1-Post. Typically, the L1-Pre section includes signaling information relating to a modulation and coding scheme for receiving the L1-Post section of the preamble. The L1-Post section includes information for receiving the data section, and in particular, a data stream or PLP, within the data section. For example, the information includes a start address of a PLP within the data section. The signaling information within the preamble may be referred to as OB signaling.

In FIG. 1, L1-Pre signaling information included in preamble 6 of frame 2a is used to receive L1-post signaling information, which is then used to receive a PLP 10 within data section 8 of frame 2a.

Signaling information is included within the data section 8 of frame 2a, typically, within a PLP. That is, the data section 8 of frame 2a includes IB signaling information, relating to the next data frame, i.e., frame 2b. Data from frame 2b, may then be decoded using the IB signaling information. This type of signaling is advantageous in that the preamble of the next data-frame need not be received, saving power consumption at a receiver, and also allowing the signaling information carried in-band to benefit from the error correction coding of the data section. A similar process is repeated in frame 2c.

However, as illustrated in frame 2d of FIG. 1, the reception of the IB signaling may be corrupted by errors in the data section of the frame that may be caused by reception conditions being temporarily poor, e.g., due to a weak signal or due to interference. In this case, in frame 2d, the receiver switches to using OB signaling information from the preamble.

However, the signaling of FIG. 1 suffers from the OB signaling lacking robustness, such that when the receiver falls back to using OB signaling because of detection of errors in the data section of a frame, the OB signaling may also be in error. Furthermore, the IB signaling is of limited robustness, being typically no more robust than the data section.

Figure 2:
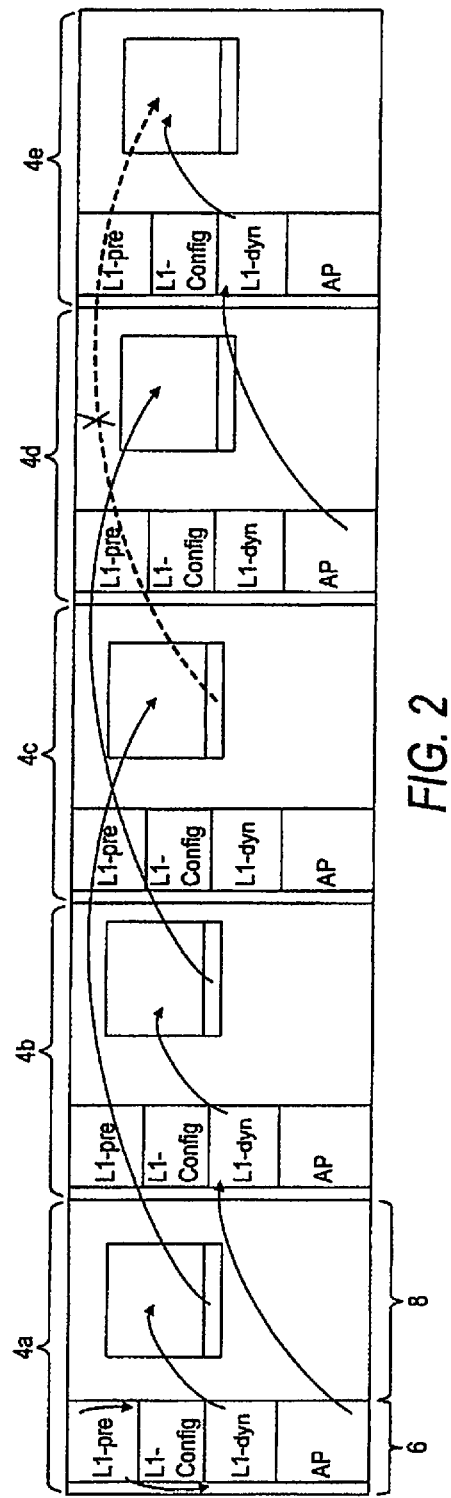
FIG. 2 illustrates signaling in a sequence of data frames according to an embodiment of the invention.

FIG. 2 illustrates signaling in a sequence of data frames according to an embodiment of the invention, which overcomes these problems in the conventional signaling.

Referring to FIG. 2, in frame 4a, the L1-Pre signaling is used to receive the L1-Post signaling as before, and this is used to receive the data section of the frame. In this case, the L1-post signaling includes L1-dyn (dynamic) and L1-config (configuration) components. L1-dyn relates to a position of a PLP within the data section of a frame, and is typically transmitted in the preamble of each frame. L1-config relates to a change in configuration of a frame and may be intermittently transmitted to indicate a change in the configuration.

In FIG. 2, at least one parity bit, which is derived from the signaling information in the preamble of a given frame, is included in the preamble of a prior frame. In this example, the at least one parity bit is one of a plurality of parity bits derived from the L1-Post part of the signaling information. Specifically, a parity bit, i.e., an Additional Parity (AP), is included in frame 4a, which is used to receive, using error correction, signaling information, in this case L1-post, included in the preamble of frame 4b, which may in turn be used to receive the data section of frame 4b. An advantage of using the parity bit from a previous frame is that the coding of the signaling information gains from time diversity, in comparison with coding only within the preamble of a given frame.

Referring to FIG. 2, IB signaling relating to a given frame, in this example, frame 4c, is included within the data section of an earlier frame, i.e., frame 4a, preceding the prior frame including the at least one parity bit AP. Accordingly, if there is an error in the data section of frame 4c, which includes signaling information relating to frame 4e, the receiver has sufficient warning that it may receive the priority bits from the AP section of the following frame, i.e., frame 4d, which can then be used with the OB signaling information in the preamble of frame 4e to receive the data from frame 4e.

Various embodiments of the invention may have the following features.

AP of the OB signaling may be placed in $I_{AP}$ previous frames, in order to improve robustness due to time diversity available across different frames.

IB signaling may cooperate with the AP, thus pointing out $I_{AP}+1$ next frames, compared to the 1 next frame in the conventional art. This allows the use of AP in case of failure or inability to use IB signaling.

Further, a new field may be introduced in the IB signaling field for cooperation with the AP, which informs the receiver to start accumulating the AP for decoding the OB signaling, e.g., when information in the L1-Post, which is not included in the IB, changes.

Individual Cyclic Redundancy Check (CRC) may be introduced for the IB signaling and data in the same PLP, instead of joint CRC as in the conventional art, thereby improving the error detection probability of the IB signaling.

IB signaling may be split into a fixed length part for use in PLP service continuity and a variable part for use in signaling updates or announcements only available in the OB signaling, such that the receiver decodes the OB signaling as signaling in the IB signaling.

IB signaling and related CRC bits may be mapped to the Low Density Parity Check (LDPC) coded bits of high degree, i.e., high reliability, thereby improving the reliability of error detection decisions due to the more robust CRC bits for the IB signaling.

As described above, the different embodiments of the present invention introduce different novel features for L1 signaling in digital broadcasting systems. Compared to conventional signaling, e.g., DVB-T2, embodiments of the present invention provide the following advantages.

Robustness may be improved for the same overhead because of the AP spread across different frames (time diversity gain).

The power consumption may be preserved because of the AP being localized in the frame (appended to the OB signaling in the current frame and not spread within the frame).

Further, power consumption may be reduced because of decoding the AP only on a need basis, i.e., after failure of IB signaling or an announcement or update carried only in following OB signaling.

Higher error detection capability may be provided for the IB signaling because of individual CRC and more robust CRC bits, and signaling bits may be provided because of the mapping to high robustness LDPC bits.

Embodiments of the invention can provide a cooperative scheme between an enhanced IB signaling and an enhanced OB signaling (additional parity), thereby improving the service continuity and enable reliable receiver decoding for updates or announcements during the service continuity. An initial scan and zapping, i.e., switching content channels, can still work with the solution of the present invention simply by resorting to the OB signaling without the AP, in order to avoid zapping delay.

IB signaling may point to at least two ($I_{AP}$+1) frames ahead with AP continuously inserted in at least one ($I_{AP}$) frame prior to the frame carrying the corresponding OB signaling (L1-Post-Dyn part).

When failing to successfully decode the IB signaling, the receiver starts accumulating the AP to ensure successful decoding of the OB signaling and avoid error propagation.

IB signaling may announce the existence and details of an AP inserted in the super-frame preceding the one within which the receiver is requested to switch over to the OB signaling (L1-Pre, L1-Post-Config) in order to acquire the L1/L2 update. That is, the IB signaling may inform the receiver of the AP details to start accumulating in order to ensure successful switch-over to the OB signaling to acquire the L1/L2 updates by the transmitter.

IB signaling may have individual CRC to improve the reliability of error detection with an optional mapping to the high degree bits of the LDPC FEC for more robustness.

The receiver may detect the IB signaling failure because the IB signaling individual CRC, and upon detecting the failure (independently of the data success or not), the receiver starts accumulating AP for use in the detection of OB L1-DYN.

In the event of failure of IB signaling, AP may be used for more robust OB signaling (L1-Dyn) as a fallback solution. The transmitter signals the number of AP blocks $I_{AP}$, the start of 1st AP block, and the length of all AP blocks, in the L1-Pre and L1-Config, and continuously inserts the AP blocks in the frames between the frames carrying adjacent IB signaling.

The receiver accesses the new AP signaling fields in L1-Pre and L1-Config and detects if an IB failure occurs through the individual IB CRC. If IB failure occurs, the receiver starts accumulating the AP blocks from the next frame until the frame preceding the point of switch over to the OB signaling.

In the event of a L1/L2 information update, AP may be used for more robust OB signaling (L1-Pre, L1-Config, L1-Dyn) for successful update acquisition. The transmitter may, in some frames (selected by the scheduler) in the super-frame preceding the super-frame where the IB-to-OB switch over is required by the transmitter, signal in the IB fields (and corresponding OB) the type (e.g., L1-pre, L1-config, and L1-dyn), and the corresponding number, start, and length, of AP blocks, and may insert the AP blocks in the frames designated by the scheduler. The receiver then accesses the AP signaling in the IB (or if IB fails in all selected frames, access the AP signaling in the OB in the current super-frame). For each type of OB signaling, the receiver starts accumulating the corresponding AP blocks from the 1st designated frame in the current super-frame until the 1st frame in the super-frame (point required by the transmitter for the switch over to the OB signaling).

As described above, aspects of the present invention introduce L1 signaling solutions and associated framing concepts that rely on cooperation between OB L1 signaling and IB L1 signaling, both of which improve robustness and efficiency as compared to the conventional art.

Table 1 below summarizes examples of different operations addressed by the present invention. In Table 1, four operations are identified, namely, initial scan, zapping (i.e., changing a content channel), update or announcement, and service continuity. In Table 1, "Out-of-band L1" refers to L1 signaling as in the conventional art, "Out-of-band L1+" refers to OB signaling according to the present invention, and "In-band L1+" refers to IB signaling according to the invention.

TABLE 1

Summary of use cases and solutions.

| Use case | Out-of-band L1 (state of art) | Out-of-band L1+ (invention) | In-band L1+ (invention) |
|---|---|---|---|
| Initial scan | X | | |
| Zapping | X | X | |
| Update or Announcement | | X* | X* |
| Service continuity | | X* | X* |

*Cooperation enabled

Referring to Out-of-band L1+, a performance improvement is brought to the OB L1 signaling by the introduction of AP bits across a number of previous frames. The number of AP bits, their contents, and the number of transporting frames are important design characteristics. Due to the additional parity bits, the effective coding rate $R_{1,\mathit{eff}}$ (initial+additional parity) is lower than the initial effective coding rate $R_{0,\mathit{eff}}$ (initial parity only). Therefore, robustness improves when using the additional parity at the expense of spectral efficiency reduction. However, splitting the AP bits across different previous frames may have an advantage of bringing time diversity, as opposed to when locating the additional parity in the same current frame. Splitting the AP bits across different previous frames may performed while preserving the advantage of localized L1 signaling in terms of power consumption.

Referring to In-band L1+, enhancements to the IB signaling L1 provides higher error protection but also cooperation with the out-of-band L1+ presented above.

As described above, FIG. 1 illustrates a conventional solution for a DVB-T2 system. In this solution, at the initial stage, the receiver decodes the OB L1-post signaling in order to access the data PLP. The data PLP embeds the IB signaling to decode the data PLP at the following frame. The merit of the IB signaling may be mainly from the robustness perspective, where the signaling benefits from the same reliability as for the data. Thus, when the IB signaling is successfully decoded, the receiver knows the signaling to access the data PLP in the following framing, and therefore, it may not have to decode the OB signaling (L1-Post). However, when the IB signaling is subject to decoding error in the current frame and the data will also likely be lost, or there are changes in the signaling that are only reflected or transmitted in the L1-post (e.g., update or announcement use case), the receiver then decodes the OB signaling (L1-post). The latter may suffer from lack of robustness, and therefore, failure to successfully use the IB signaling in the previous frame will propagate the error to the current frame due to the weak OB fall-back solution. A potential improvement for the robustness of the OB signaling is to lower the coding rate, thus lowering the spectral efficiency), of the out-of-band signaling, which may be used occasionally for the recovery of an IB signaling failure.

According to an embodiment of the present invention, cooperation is provided between OB signaling with improved robustness because AP and the adapted IB signaling. For this combination to work properly, the IB signaling provides information for accessing the data PLP, after a number $I_{AP}$ of frames following the immediately following frame. An example is illustrated in FIG. 2, where AP of the OB signaling (L1-post) is transmitted in $I_{AP}=1$ previous frame, such that the IB signaling provides the access to the desired PLP, after $I_{AP}+1=2$ following frames.

In FIG. 2, the L1-dyn part of the L1-Post signaling is first used to access the data PLP at the initial stage. This allows the decoding of the data and IB signaling at the first frame. The IB signaling signals the data PLP at the third frame. At the second frame, the L1-dyn signaling with its AP from the first frame will be used to access the data and embedded IB signaling. When the IB signaling fails or cannot be used, the receiver may then be able to rely on the L1-dyn in the desired frame and its corresponding AP in the previous frame to access the data PLP and IB signaling in the desired frame.

For successful cooperation between enhanced IB and OB signaling, especially, for an update or announcement, in accordance with embodiment of the invention, a field is provided in the IB signaling that informs the receiver to start accumulating the AP to help decoding the OB signaling, the OB signaling including the signaling information related to the announcement.

In accordance with an embodiments of the present invention, a separate error detection capability is provided to the IB signaling, instead of joint error detection at the frame level.

Specifically, for long frames at relevant operating Bit Error Rates (BERs), e.g., $10^{-4}$, an overall frame error is more likely than an IB signaling error inside the frame, as the IB signaling has a short length. Therefore, declaring the IB signaling erroneous, as a result of a frame error, may not be accurate for the IB signaling.

In accordance with an embodiment of the present invention, in order to provide equal error detection, i.e., accurate for the overall frame and the IB signaling, an individual CRC is included for the IB signaling. The IB signaling can also be decomposed into a fixed length part for PLP service continuity, and a variable part for an announcement.

Further, the IB signaling and related CRC bits may be mapped to the LDPC coded bits of high degree, i.e., high reliability, which may not impact the LDPC decoding robustness, but provides better error correction probability of the IB signaling bits, which may ensure more reliable error detection decisions based on more correct/reliable IB signaling CRC bits.

Figure 3:
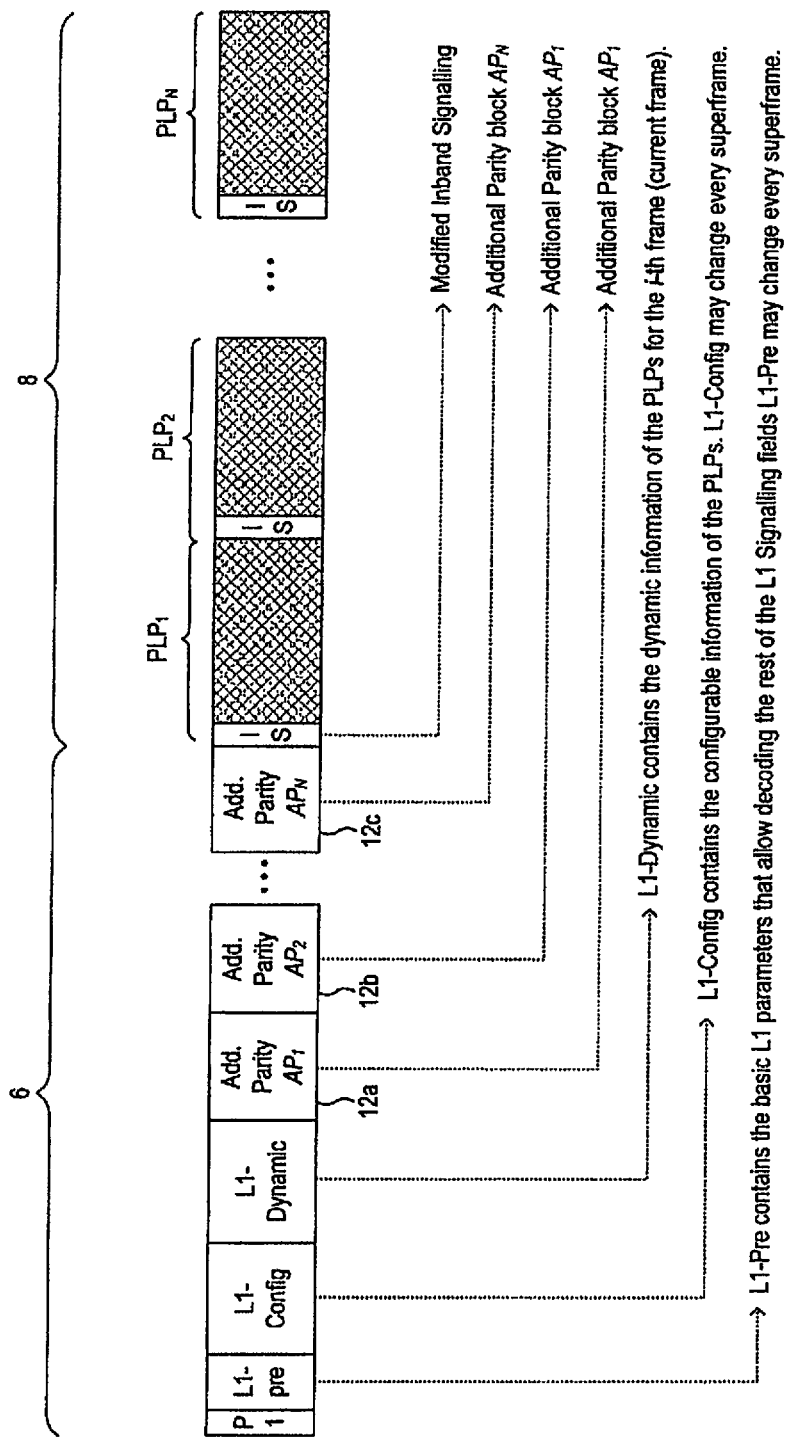
FIG. 3 illustrates a data frame format according to an embodiment of the invention.

FIG. 3 illustrates a data frame format according to an embodiment of the invention.

Referring to FIG. 3, the preamble section includes AP fields 12a, 12b and 12c. Additionally, L1-Conf and L1-Dyn may be encoded together to generate the L1-Post. Further, an optional L1-Dyn Ext could be transmitted when the length of the L1-Dyn is not sufficient, where L1-Dyn Ext is encoded separately. The length of the L1-Dyn Ext is signaled in the normal L1-Dyn. The number of Additional Parity blocks N is equal to IAP and each parity block APi includes additional parity bits for the OB signaling transmitted i frames after the current frame.

Figure 4:
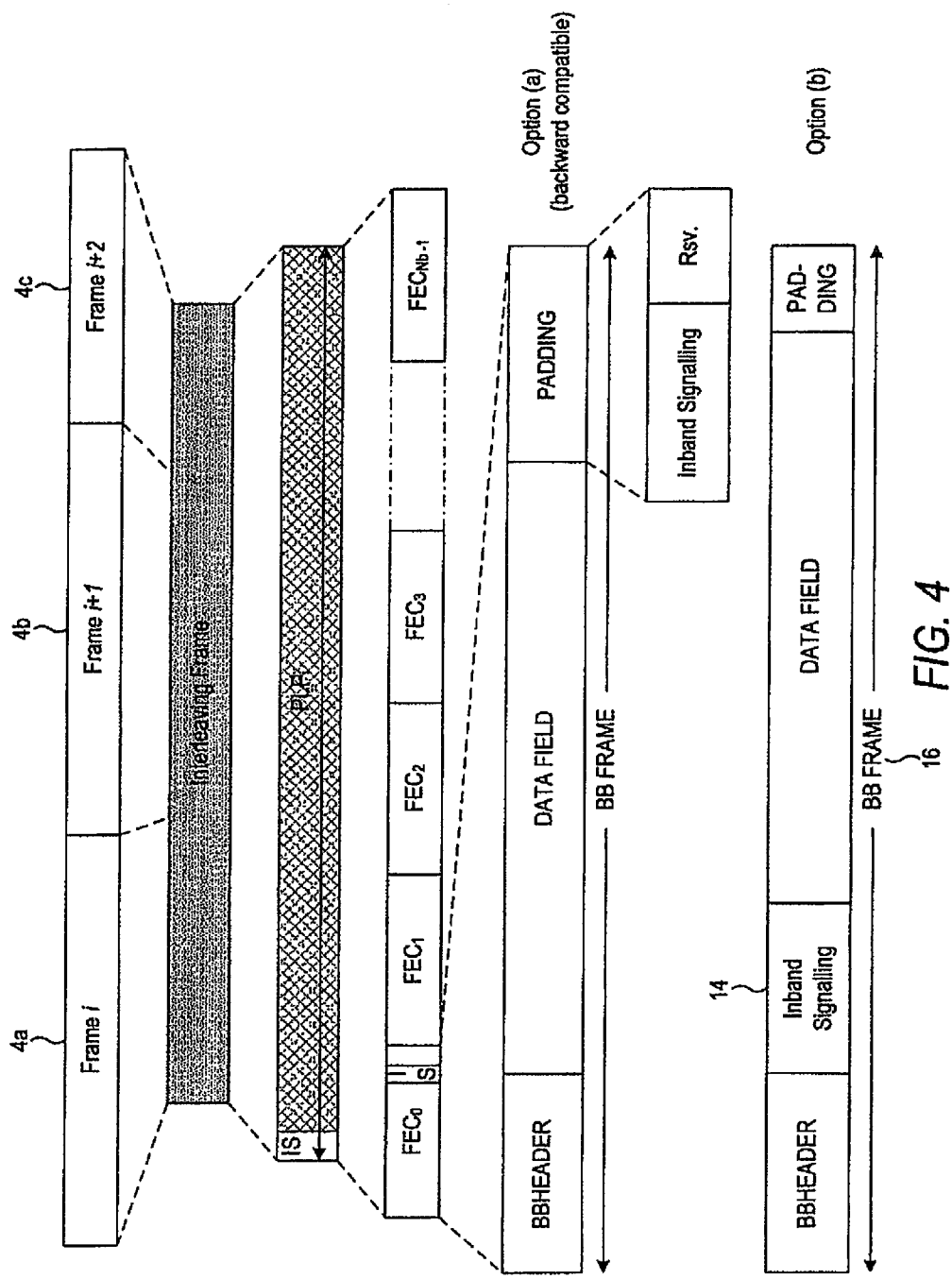
FIG. 4 illustrates encapsulation of IB signaling according to an embodiment of the invention.

FIG. 4 illustrates encapsulation of IB signaling according to an embodiment of the invention. Specifically, in FIG. 4 two options for encapsulating the BBFrames and the IBS are illustrated.

The first option, which corresponds to the SoA, illustrates IB signaling transmitted after the payload. The use of IB is signaled in the OB, and the length of the IB is obtained from the BBHeader.

In the second option, the IB signaling is placed just after the BBHeader, such that the IB bits are mapped to bits that are more protected by the LDPC.

Referring to FIG. 4, IB signaling 14 may optionally be placed towards the beginning of a data stream frame, i.e., a baseband frame 16.

FIG. 5 illustrates a baseband header according to an embodiment of the invention.

Referring to FIG. 5, the position of signaling information within a physical layer pipe is indicated by a header of a baseband frame.

Referring to FIG. 5, two options are illustrated for signaling the IB length. In the first option, the SoA solution is modified replacing one byte previously used to signal the Input Stream Identifier by the IB length. In a second option, an extra byte is added to the BBHeader including the length of the IB length.

FIGS. 6, 7, and 8 illustrate IB signaling content according to an embodiment of the invention.

Specifically, FIG. 6 illustrates IB signaling content according to an embodiment of the invention.

Referring to FIG. 6, a flag 18 is included to indicate an L1 change at the next superframe. Also, signaling 20 is included to signal AP in the event of L1 changes, and an individual CRC 22 is also signaled.

FIG. 7 illustrates L1-Pre OB signaling content according to an embodiment of the invention.

Referring to FIG. 7, a separate L1-config and L1-dyn parts have separate signaling for each field identified as 24.

FIG. 8 illustrates L1-Config OB signaling content according to an embodiment of the invention.

Referring to FIG. 8, an IB pointer 26 and signaling of AP 28 are added.

Figure 9A:
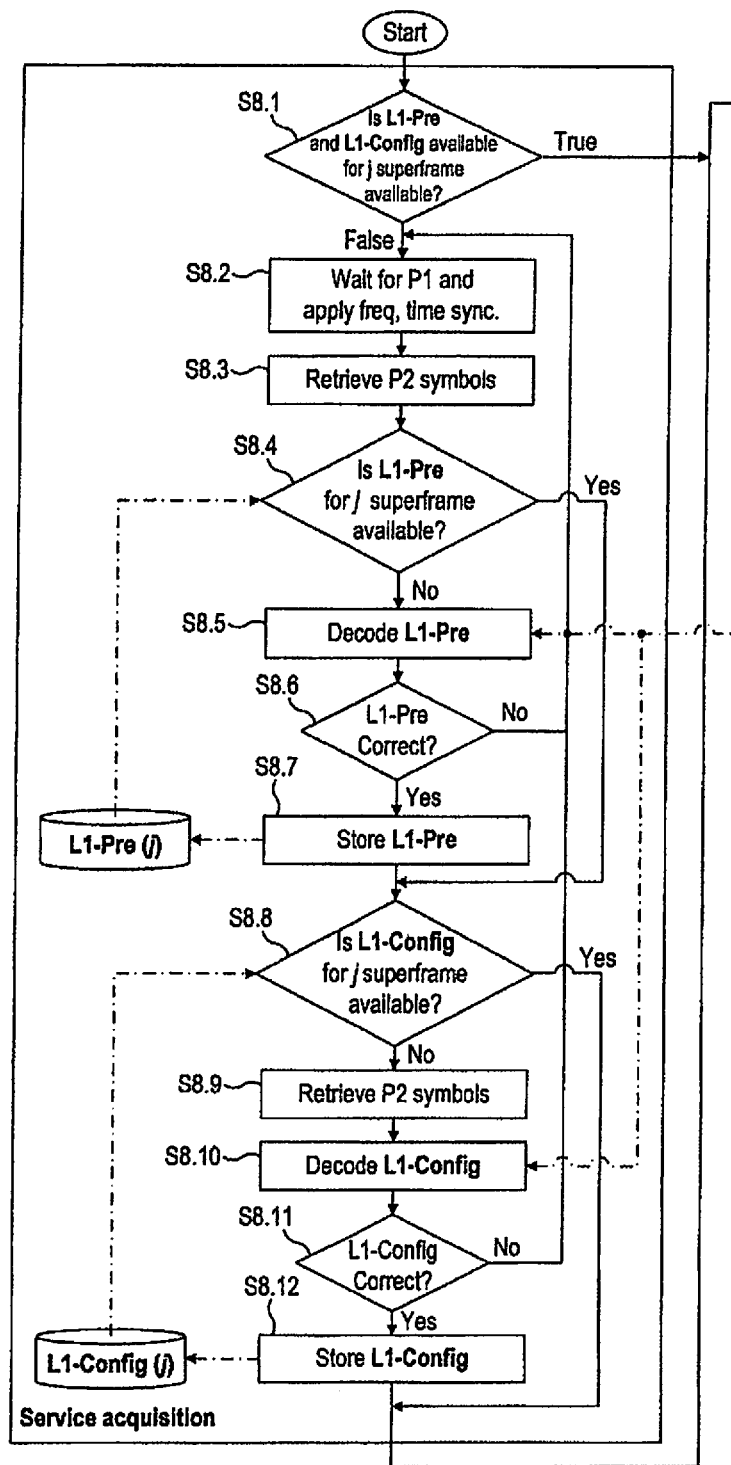
FIGS. 9A and 9B are a flow charts illustrating a signaling method of a receiver according to an embodiment of the invention.
Figure 9B:
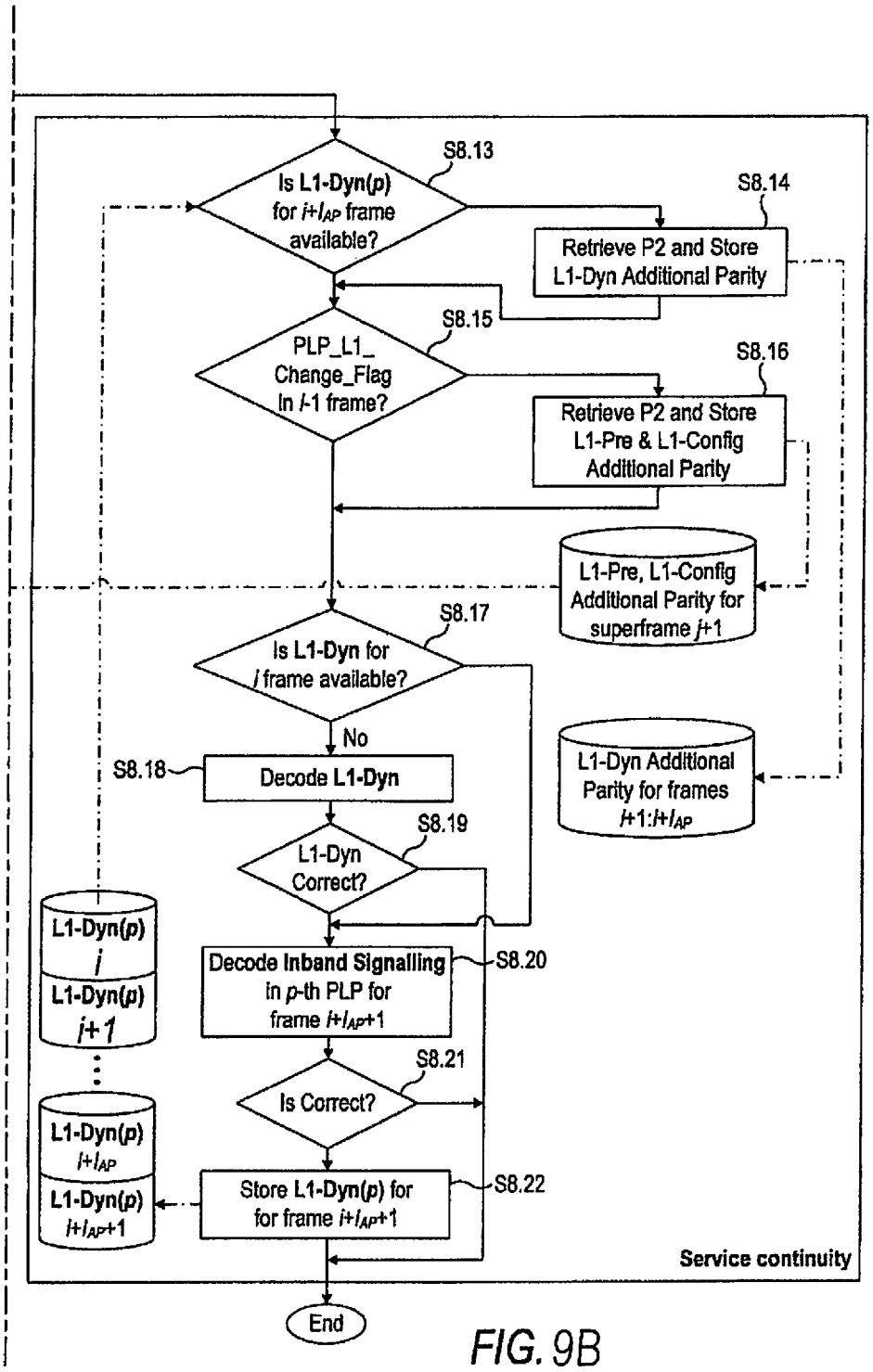

FIGS. 9A and 9B are flow charts illustrating a signaling method of a receiver according to an embodiment of the invention.

Referring to FIG. 9A, in step S8.1 the receiver determines if L1-Pre and L1-Config are available for a j superframe. If the L1-Pre and the L1-Config are not available for the j superframe, in step S8.2 the receiver waits for P1 and applies a frequency time synchronization. In step S8.3, the receiver retrieves P2 symbols.

In step S8.4, the receiver determines if the L1-Pre is available for the j superframe. When the L1-Pre is not available for the j superframe, the receiver decodes the L1-Pre in step S8.5.

In step S8.6, the receiver determines if the L1-Pre is decoded correctly. When the L1-Pre is decoded correctly, the L1-Pre is stored in step S8.7. However, when the L1-Pre is not decoded correctly in step S8.6, the procedure returns to step S8.2, where the receiver again waits for P1 and applies a frequency time synchronization.

After storing the L1-Pre in step S8.7 or when the L1-Pre is available for the j superframe in step S8.4, the receiver determines if the L1-Config is available for the j superframe in step S8.8. When the L1-Config is not available for the j superframe, the receiver retrieves P2 symbols in step S8.9, and decodes L1-Config in step S8.10.

In step S8.11, the receiver determines if the L1-Config is decoded correctly. When L1-Config is decoded correctly, the L1-Config is stored in step S8.12. However, when the L1-Config is not decoded correctly in step S8.11, the procedure returns to step S8.2, where the receiver again waits for P1 and applies a frequency time synchronization.

After storing the L1-Config in step S8.12 or when the L1-Pre and the L1-Config are available for the j superframe in step S8.1, the receiver determines if L1-Dyn(p) is available for an i+$I_{AP}$ frame in step S8.13, as illustrated in FIG. 9B.

When the L1-Dyn(p) is not available for the i+$I_{AP}$ frame in step S8.13, in step S8.14, the receiver retrieves P2 symbols and stores AP for L1-dyn signaling.

When the L1-Dyn(p) is available for the i+$I_{AP}$ frame in step S8.13 or after step S8.14, the receiver determines if a PLP_L1_Change_Flag is available for an i−1 frame in step S8.15. When the PLP_L1_Change_Flag is not available for the i−1 frame, the receiver retrieves P2 symbols and stores AP for L1-pre and L1-config signaling in step S8.16.

When the PLP_L1_Change_Flag is not available for the i−1 frame in step S8.15 or after step S8.16, the receiver determines if L1-Dyn is available for an i frame in step S8.17. When the L1-Dyn is not available for the i frame in step S8.17, the receiver decodes L1-Dyn in step S8.18 and determines if L1-Dyn is decoded correctly in step S8.19. When the L1-Dyn is not decoded correctly, the procedure ends.

When the L1-Dyn is decoded correctly, the receiver decodes IB signaling for a p-th PLP for an i+$I_{AP}$+1 frame in step S8.21, and determines if the IB signaling is decoded correctly in step S8.21. When the IB signaling for the p-th PLP for the i+$I_{AP}$+1 frame is not decoded correctly, the procedure ends.

When the IB signaling for the p-th PLP for the i+$I_{AP}$+1 is decoded correctly, the receiver stores L1-Dyn(p) for the i+$I_{AP}$+1 frame in step S8.22.

Figure 10:
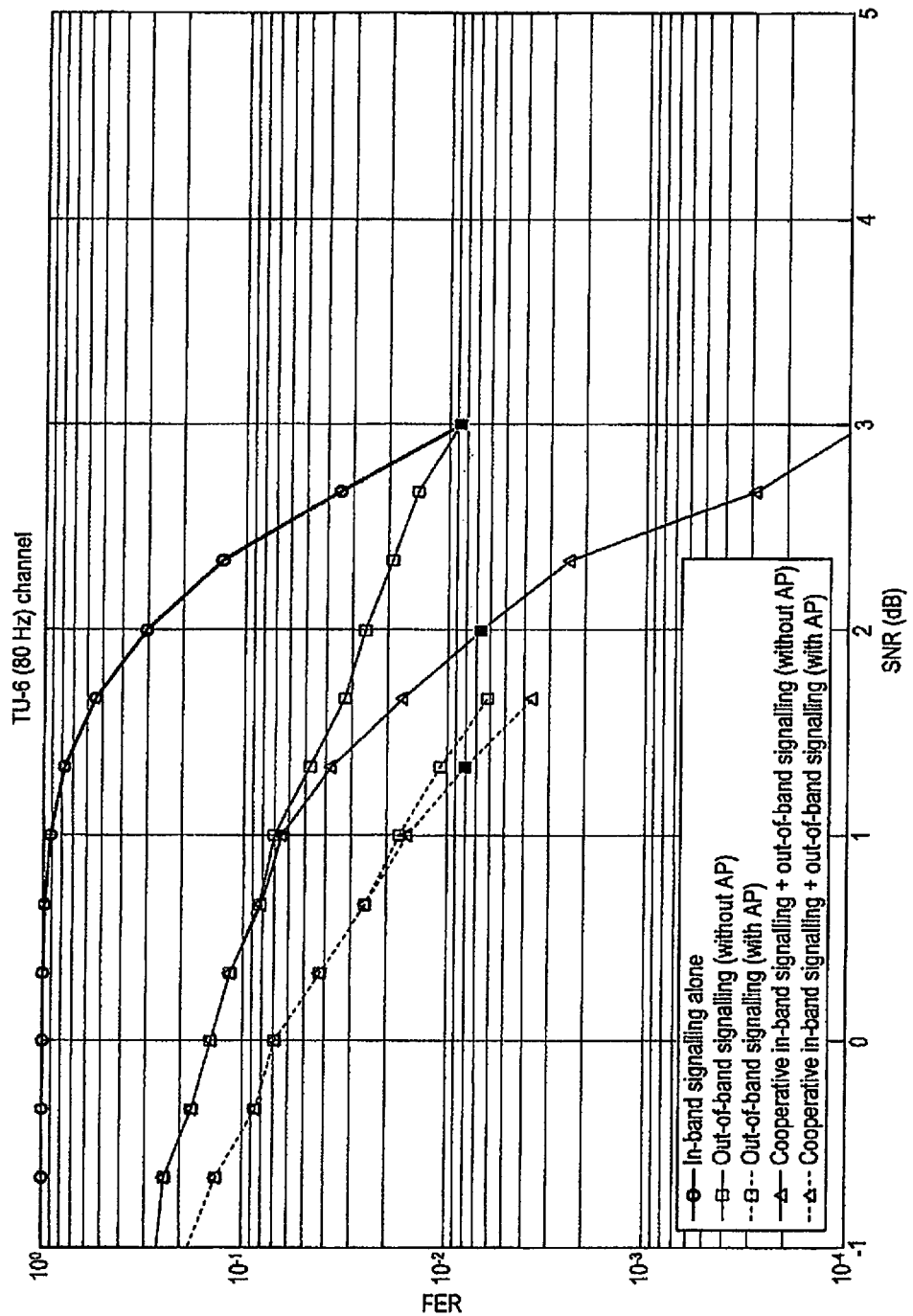
FIG. 10 is a graph illustrating frame error rates for various signaling types according to an embodiment of the invention.

FIG. 10 is a graph illustrating frame error rates for various signaling types according to an embodiment of the invention. Specifically, FIG. 10 presents a Frame Error Rate (FER) measured as a function of the Signal to Noise Ratio (SNR) for different scenarios.

Referring to FIG. 10, a TU-6 channel model is assumed with 80 Hz Doppler frequency. The IB signaling MODulation and CODing (MODCOD) is Quadrature Phase Shift Keying (QPSK) with DVB-T2 16 k LDPC rate 4/9. The OB signaling uses Binary Phase Shift Keying (BPSK) with DVB-T2 16 k LDPC rate 4/9, but an effective code rate 1/3. The OB signaling with AP also uses BPSK and has effective code rate 1/3. Accordingly, the OB signaling with or without AP has the same overhead.

A first scenario considers the IB signaling alone, i.e., without any cooperation with the OB signaling.

A second scenario considers the OB signaling alone, without AP.

The first and second scenarios represent reference scenarios in the conventional art, e.g., DVB-T2.

A third scenario shows the OB signaling alone, i.e., no cooperation with IB signaling, but with AP as proposed in the present invention. Comparing to the second scenario, the third scenario experiences a 1.5 dB gain from the introduction of the AP to the OB signaling, i.e., out-of-band L1+.

A fourth scenario shows a cooperative scheme of IB signaling and OB signaling, without AP. The fourth scenario experiences significant gain because of the enabled cooperation of two nearly independent error events on the OB and IB signaling, compared to the first scenario and the second scenario, supporting the merit of enabling the cooperation, even when not using the AP as proposed in this invention.

A fifth scenario shows the cooperative scheme of IB signaling and OB signaling with AP, as proposed by the present invention. Compared to the cooperative fourth scenario without AP, the AP of the fifth scenario brings a significant gain of nearly 0.8 dB.

Thus, as a first conclusion, a cooperative scheme between IB and OB signaling provides a significant gain up to 1 dB, when compared to the conventional art, e.g., FIG. 1.

Further, enhancements of the IB signaling with individual CRC and mapping of IB signaling bits to high reliability LDPC bits provides higher gain, because the cooperative scheme performs as the product of OB and IB signaling, such that any improvement of the IB signaling may convert into performance improvement of the cooperative scheme. As a result, the gain of a co-operative scheme may be higher than 0.8 dB.

Figure 11:
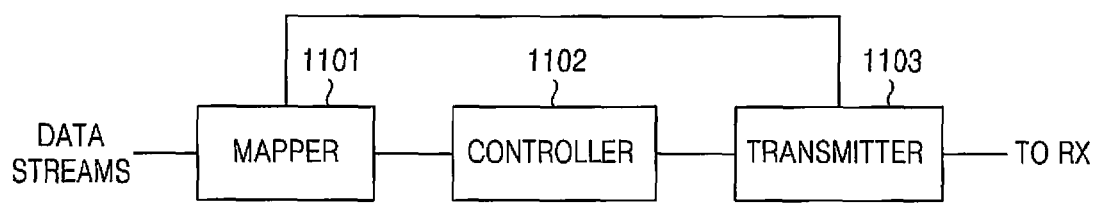
FIG. 11 is block diagram illustrating a transmission device according to an embodiment of the invention.

FIG. 11 is block diagram illustrating a transmission device according to an embodiment of the invention.

Referring to FIG. 11, the transmission device includes a mapper 1101, a controller 1102, and a transmitter 1103. The mapper 1101 maps a plurality of data streams onto a plurality of frames, under the control of the controller 1102. For example, the controller 1102 controls the mapper 1101 to map onto the frames in accordance with any of the above-described methods. The transmitter 1103 transmits the frames including the plurality of data streams.

Figure 12:
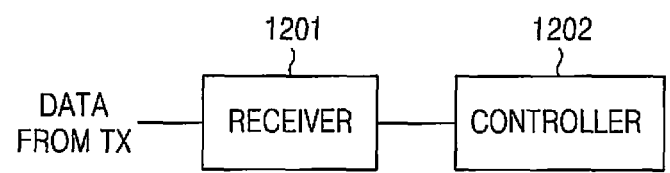
FIG. 12 is block diagram illustrating a receiving device according to an embodiment of the invention.

FIG. 12 is block diagram illustrating a receiving device according to an embodiment of the invention.

Referring to FIG. 12, the receiving device receives data including a plurality of data streams, the data being arranged in a plurality of frames, wherein each of the plurality of frames including a preamble section and a data section. The receiving device includes a receiver 1201 for plurality of frames, and a controller 1202 for processing the received plurality of frames in accordance with the above-described methods, e.g., in accordance with the method illustrated in FIGS. 9A and 9B.

The above-described embodiments are to be understood as illustrative examples of the present invention. It is to be understood that any feature described in relation to any one embodiment may be used alone, or in combination with other features described, and may also be used in combination with one or more features of any other of the embodiments, or any combination of any other of the embodiments.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of transmitting at least one data stream by a transmitter in a wireless communication system, the method comprising:
   generating a frame including a preamble section and a data section, the preamble section including signaling information and the data section including at least one data stream; and
   transmitting the generated frame,
   wherein the signaling information includes first information including information related to the at least one data stream and second information including information related to the first information, and
   wherein at least one parity bit associated with the first information is inserted into a preamble section in a prior frame preceding the generated frame.

2. The method of claim 1, wherein the first information includes position information of the at least one data stream and configuration information of the frame.

3. The method of claim 1, wherein the at least one parity bit is generated based on the signaling information.

4. The method of claim 1, further comprising:
inserting a part of the signaling information included in the preamble section into a data section in the prior frame preceding the generated frame.

5. A transmission device for transmitting at least one data stream in a wireless communication system, the transmission device comprising:
a controller configured to generate a frame including a preamble section and a data section, the preamble section including signaling information and the data section including at least one data stream; and
a transmitter configured to transmit the generated frame,
wherein the signaling information includes first information including information related to the at least one data stream and second information including information related to the first information, and
wherein at least one parity bit associated with the first information is inserted into a preamble section in a prior frame preceding the generated frame.

6. The transmission device of claim 5, wherein the first information includes position information of the at least one data stream and configuration information of the frame.

7. The transmission device of claim 5, wherein the at least one parity bit is generated based on the signaling information.

8. The transmission device of claim 5, wherein the controller is further configured to insert a part of the signaling information included in the preamble section into a data section in the prior frame preceding the generated frame.

9. A method of receiving at least one data stream by a receiver in a wireless communication system, the method comprising:
receiving the at least one data stream including a frame, wherein the frame includes a preamble section and a data section, the preamble section including signaling information and the data section including at least one data stream; and
processing the at least one data stream,
wherein the signaling information includes first information including information related to the at least one data stream and second information including information related to the first information, and
wherein at least one parity bit associated with the first information is inserted into a preamble section in a prior frame preceding the generated frame.

10. The method of claim 9, wherein the first information includes position information of the at least one data stream and configuration information of the frame.

11. The method of claim 9, wherein the at least one parity bit is generated based on the signaling information.

12. The method of claim 9, wherein a part of the signaling information included in the preamble section is inserted into a data section in the prior frame preceding the generated frame.

13. A receiving device for receiving at least one data stream in a wireless communication system, the receiving device comprising:
a receiver configured to receive the at least one data stream including a frame, wherein the frame includes a preamble section and a data section, the preamble section including signaling information and the data section including at least one data stream; and
a controller configured to process the at least one data stream,
wherein the signaling information includes first information including information related to the at least one data stream and second information including information related to the first information, and
wherein at least one parity bit associated with the first information is inserted into a preamble section in a prior frame preceding the generated frame.

14. The receiving device of claim 13, wherein the first information includes position information of the at least one data stream and configuration information of the frame.

15. The receiving device of claim 13, wherein the at least one parity bit is generated based on the signaling information.

16. The receiving device of claim 13, wherein a part of the signaling information included in the preamble section is inserted into a data section in the prior frame preceding the generated frame.

* * * * *